May 3, 1966 R. M. RICKERT 3,249,703
SWITCHING CONVERTER POWER SUPPLIES
WITH SERIES-CONNECTED INPUTS
Filed Feb. 25, 1963 2 Sheets-Sheet 1

INVENTOR
R. M. RICKERT
BY
ATTORNEY

United States Patent Office 3,249,703
Patented May 3, 1966

3,249,703
SWITCHING CONVERTER POWER SUPPLIES
WITH SERIES-CONNECTED INPUTS
Richard M. Rickert, Westfield, N.J., assignor to Bell Telephone Laboratories, Incorporated, New York, N.Y., a corporation of New York
Filed Feb. 25, 1963, Ser. No. 260,916
3 Claims. (Cl. 179—170)

This invention relates to systems for supplying power to a plurality of loads and, more particularly, systems such as submarine cable systems in which power is fed to a plurality of loads in series.

Experience has shown that power is preferably supplied to a plurality of loads, such as repeaters, along a submarine cable by a direct current which is regulated to be substantially constant in order to obtain best performance and longest life of the cable.

Heretofore, power has been obtained from the direct current at remote points along the cable by connecting resistors in series in the direct-current path, as shown in the O. E. Buckley Patent 2,020,297, issued November 12, 1935. The voltage drop across such a resistor supplies the plate voltage for a vacuum tube amplifier.

Substantial power is wasted in the series resistors as heat. While the waste may be reduced by using the resistors as cathode heaters, modern amplifying devices such as transistors make such schemes irrelevant.

It is the object of this invention to supply power serially to a plurality of loads with increased efficiency.

Accordingly, applicant has recognized that a more efficient system may be achieved if power is fed to the loads through reactive storage impedances, in place of the power dissipating resistances. However, unless the power fed into each reactive impedance is drained off by its load over a reasonable period of time, the voltage across the reactive impedances in the direct-current path of the cable may build up in such a manner as to make it impossible for the regulator at the land terminals of the cable to hold the direct current substantially constant.

In accordance with the invention, applicant has provided electronically controlled switches for shunting the direct current of the cable around the reactive impedances periodically and has provided feedback for controlling the length of the closed and open periods of each switch in response to the voltage, current or power supplied to the load which is coupled to the cable by that switch and the corresponding reactive impedance. In particular, the average input voltage of each reactive impedance may be held substantially constant so that the total voltage drop along the cable does not unduly burden the voltage capabilities of the direct-current regulators at the land terminals of the cable.

Furthermore, if a sufficiently large number of such combinations of reactive impedances and switches are placed along the cable, the unsynchronized operation of the switches under the control of their separate feedback circuits will produce a direct-current voltage at the land terminals of the cable with a statistically predictable percentage R.M.S. ripple which is inversely related to the number of such combinations.

Further features and advantages of the invention will become apparent from the following detailed description and the drawing in which.

Figure 1:
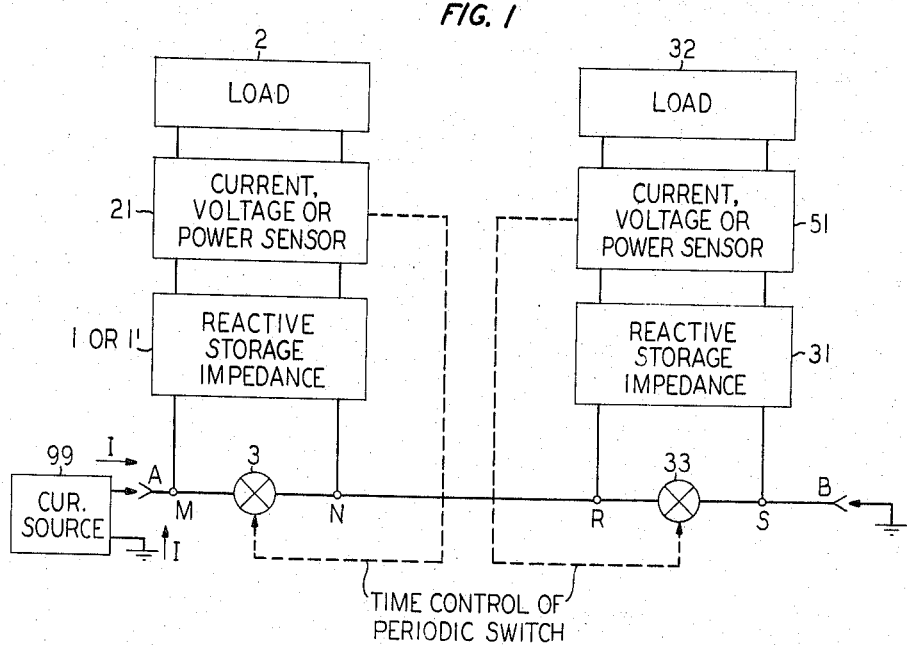
FIG. 1 is a schematic and block diagrammatic illustration of a system according to the invention.

In the illustrative system shown in FIG. 1, terminals A and B are connected across current source 99 and receive a current I from which sufficient power must be taken to supply loads 2 and 32, which may have variable impedances. Input terminals M and N of reactive storage impedance 1 are connected to terminal A and to input terminal R of storage impedance 31, respectively. Input terminal S of impedance 31 is connected to terminal B. Switch 3 is connected across terminals M and N, and switch 33 is connected across terminals R and S. Switches 3 and 33 are devices which oscillate continuously between high and low impedance conditions at a rate which is influenced by sensors 21 and 51, respectively. Load 2 is coupled with reactive storage impedance 1 to draw power from impedance 1. The output voltage, current or power sensor 21 comprises part of the coupling between impedance 1 and load 2 in order to provide a feedback signal for controlling switch 3. Load 32 and power sensor 51 are similarly coupled with reactive storage impedance 31. Sensor 51 provides a feedback signal for controlling switch 33.

Figure 2:
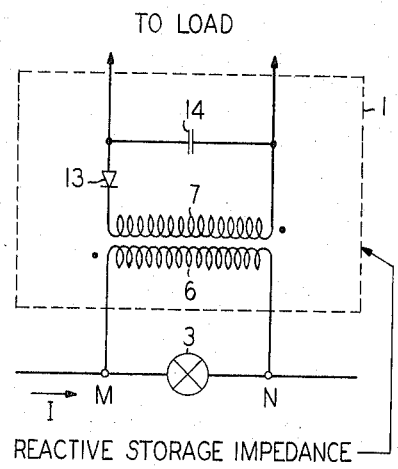
FIG. 2 and FIG. 3 are schematic diagrams of typical reactive storage impedances and their shunt switches for use in systems according to the invention.
Figure 3:
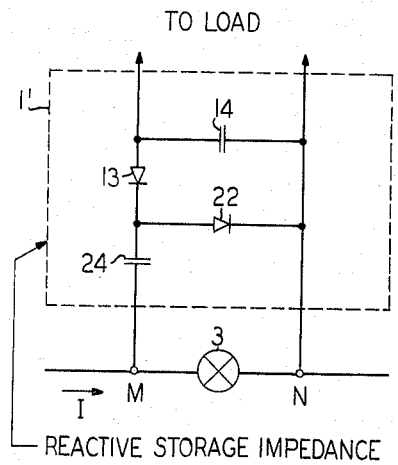

Reactive storage impedances 1 and 31 each may assume the form shown in FIG. 2 or the form shown in FIG. 3. Impedance 1 is labeled "1 or 1'" in FIG. 1 to emphasize this fact. Switch 3 is shown additionally in both figures to make the circuit relationships clear. In FIG. 2, winding 6 is connected across terminals M and N. Winding 7 is coupled to winding 6. Diode 13 and capacitor 14 are connected in series across winding 7, with diode 13 oriented to conduct when the induced voltage of winding 6 tends to oppose current flowing from terminal M to terminal N through winding 6. Load 2 may be connected across the terminals of capacitor 14. In FIG. 3, capacitor 24 and diode 22 are connected in series across terminals M and N, with diode 22 oriented to conduct current flowing from terminal M to terminal N through capacitor 24. Capacitor 14 is connected in series with diode 13 across diode 22 in order to be charged by current discharging capacitor 24 through switch 3 and diode 13 when switch 3 is closed. The cathode of diode 13 is connected to the anode of diode 22.

In operation, the basic embodiment of the invention shown in FIG. 1 is able to exceed the efficiency of the prior art in supplying power to a plurality of loads in series because the cooperation of sensor 21 with switch 3 and the cooperation of sensor 51 with switch 33 keep the total voltage drop in the direct-current path between points A and B within reasonable limits without the dissipative shunting resistances of the prior art. Specifically, when the current supplied by source 99 is constant, the average voltage across terminals M and N may be kept constant as the impedance of load 2 varies; and the average voltage across terminals R and S may be kept constant as the impedance of load 32 varies. Under these equilibrium conditions, it may be seen that a constant average power is taken in short bursts from the line by each of reactive storage impedances 1 and 31, stored in the impedances 1 and 31, and supplied smoothly to loads 2 and 32, respectively. In order to achieve this result, sensor 21 must control switch 3 independently of the action of sensor 51 in controlling switch 33. Sensor 21 opens and closes switch 3 periodically in response to output parameters associated with load 2 which are determinative of the voltage between terminals M and N; and sensor 51 opens and closes switch 33 periodically in response to output parameters associated with load 32 which are determinative of the voltage between terminals R and S.

Exactly how the feedback control of switches 3 and 33 is achieved with the type of reactive storage impedances illustrated in FIG. 2 is explained hereinafter in connection with the embodiment of FIG. 4. It may be noted here that the principal energy storage is provided by capacitor 14 in the impedance of FIG. 2. The feedback control of either switch 3 or 33 when interconnected with a reactive storage impedance of the type illustrated in FIG. 3 may be accomplished in a manner satisfactory for the purposes of the present invention by the circuit of FIG. 3 of the copending application of S. D. Bloom and applicant, Serial No. 260,662, filed on an even date herewith. It may be noted that in the circuit of FIG. 3, energy is stored on capacitor 24 while switch 3 is open and then is delivered to the output storage capacitor 14 while switch 3 is closed.

Figure 4:
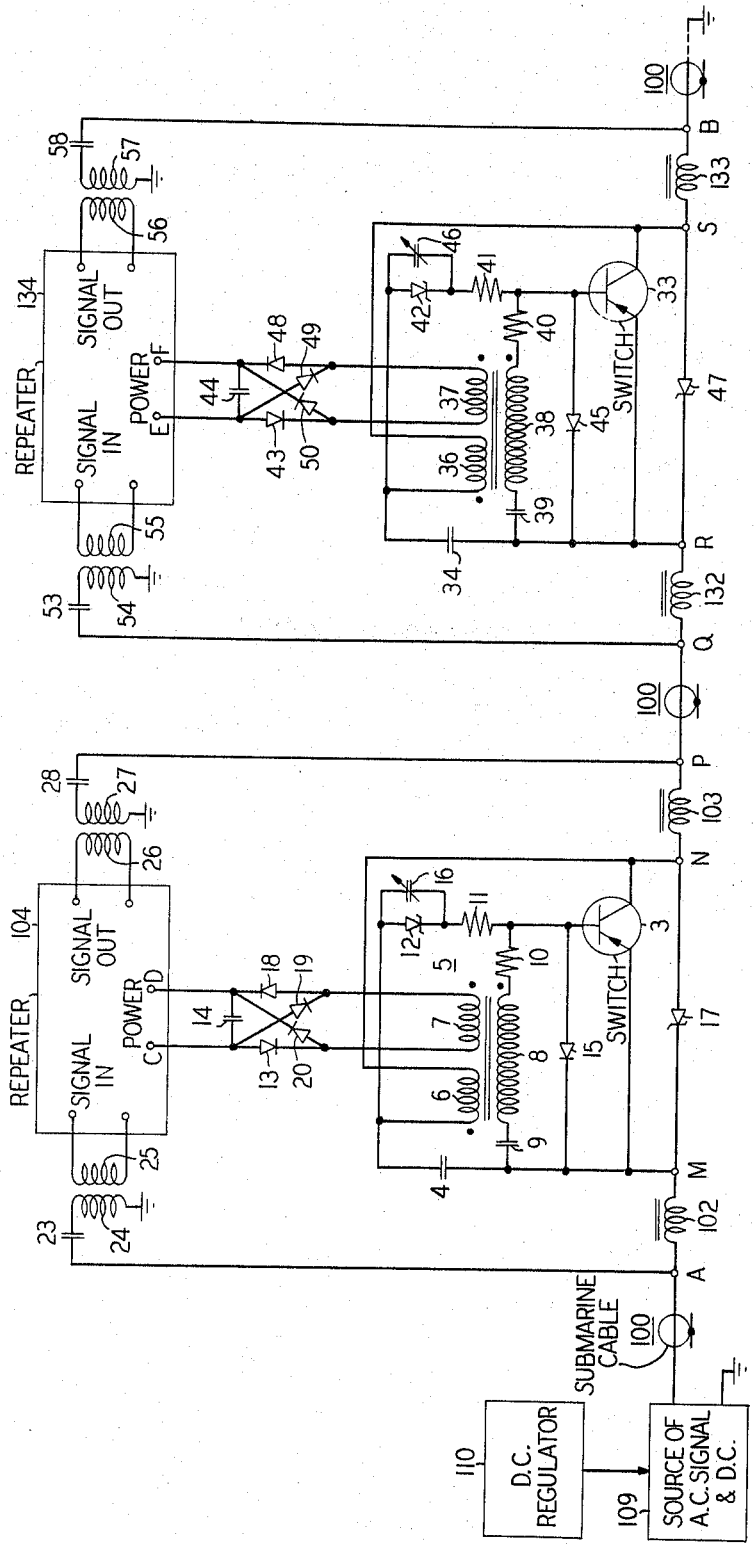
FIG. 4 is a detailed schematic and block diagrammatic showing of a preferred embodiment of the invention for supplying power to repeaters and other components along a communication line.

The complete preferred embodiment of the invention is illustrated in FIG. 4. Submarine cable 100 is illustrated as having a conductor which carries both direct current and an alternating-current signal. A variety of other conductor arrangements are possible for carrying alternating current and direct current in the same cable. The signal and the direct current are combined and applied to the cable by source 109. The direct current in the cable is regulated to be substantially constant by direct-current regulator 110. An excellent regulator for this purpose is disclosed in the copending application of B. H. Hamilton, Serial No. 853,559, filed November 17, 1959, now Patent 3,135,910. One regulator is shown in FIG. 4 for purposes of illustration although in a practical system one or more regulators might be used at both ends of cable 100 to allow one end of the cable to be positive with respect to ground while the other end is negative with respect to ground. Such an arrangement of regulators minimizes dielectric stresses in cable 100.

The alternating-current path along cable 100 is interrupted at point A by a power separation filter. One terminal of choke coil 102 is connected to terminal A and its other terminal is connected to terminal M to block alternating current from point M and to transmit direct current to point M. Blocking capacitor 23 is connected in series with transformer winding 24 between terminal A and grounds. Capacitor 23 blocks direct current from, and passes alternating current to, winding 24. The alternating-current signal is coupled from winding 24 to the signal input terminals of repeater 104 by transformer secondary winding 25.

Transformer winding 16 is connected across the output signal terminals of repeater 104 and coupled with transformer winding 27. Winding 27 and direct-current blocking capacitor 28 are connected in series between ground and point P of cable 100, in order to apply the output signal of repeater 104 to a continuation of cable 100. Choke coil 103 is connected between terminals N and P to conduct direct current from point N to point P and to block the output signal of repeater 104 from point N. It is understood that the power separation filters described above as being connected to terminals A and P are only examples of a wide variety that may be used.

A continuing section of cable 100 runs from terminal P to terminal Q; and at point Q power separation means similar to that described above couples the direct current to terminal R and the alternating-current signal to the input of repeater 134. The amplified signal from repeater 134 and the direct current from terminal S are recombined at terminal B and transmitted along another section of cable 100. Circuit components between terminals Q and B corresponding to circuit components between terminals A and P are numbered thirty (30) digits higher.

Between terminals M and N and between terminals R and S are connected the inputs of first and second switching converters, respectively, according to FIG. 2 of the above-cited copending application of S. D. Bloom and applicant.

Switches 3 and 33, corresponding to the like-numbered switches of FIG. 1, are specifically shown as PNP transistors with emitter-collector current paths connected across input terminals M—N and R—S, respectively. The emitter of transistor 3 is connected to terminal M; and the collector of transistor 3 is connected to terminal N. The emitter of transistor 33 is connected to terminal R, and its collector is connected to terminal S. The cathode of protective Zener diode 17 is connected to terminal M, and its anode is connected to terminal N. The cathode of protective Zener diode 47 is connected to terminal R, and its anode is connected to terminal S. Zener diode 17 or 47 conducts only when its associated switching converter circuit fails with switch 3 or 33, respectively, in its nonconducting condition.

In the switching converter connected between terminals M and N, capacitor 4 and primary winding 6 of transformer 5 are connected in series between the emitter and collector of transistor 3, with capacitor 4 connected to the emitter. The terminal of output winding 7 of transformer 5 which is positive when the induced voltage of winding 6 is opposing current flowing from terminal M is connected to the anode of diode 18 and to the cathode of diode 19. The other terminal of winding 7 is connected to the cathode of diode 13 and the anode of diode 20. The cathodes of diodes 18 and 20 are connected to the one side of filter capacitor 14; and the anodes of diodes 13 and 19 are connected to the other side of capacitor 14. Capacitor 14 is connected between power input terminals C–D of repeater 104.

According to the invention of the above-cited copending application of S. D. Bloom and applicant, a trigger circuit comprising resistor 11 and Zener diode 12 is connected in series between the base of transistor 3 and the common connection of capacitor 4 and the winding 6, with the anode of Zener diode 12 connected to the common connection. Capacitor 16 is connected in parallel with Zener diode 12. In addition, a regenerative feedback circuit comprises capacitor 9, winding 8 of transformer 5 and resistor 10 connected in series between the base and emitter of transistor 3, with winding 8 poled to oppose base current of transistor 3 when the induced voltage of winding 6 tends to oppose current flowing from terminal A. This regenerative feedback circuit, by virtue of the coupling of winding 8 with winding 7, provides the sensor 21, as shown in FIG. 1, and, by virtue of the coupling of winding 8 with winding 6, provides the continuous oscillation capabilities previousy attributed to switch 3. The anode of diode 15 is connected to the base of transistor 3, and its cathode is connected to the emitter of transistor 3.

The circuitry connected between terminal R and terminal S is identical to the circuitry connected between terminals M and N, except that components are numbered thirty (30) digits higher than the corresponding components between terminals M and N.

The embodiment of FIG. 4 not only illustrates the general principles of operation as described hereinbefore in connection with the embodiment of FIG. 1, but also illustrates several advantageous features of operation which flow from the fact that transformer coupling to terminals C–D and E–F is used.

Specifically, in operation, the substantially constant direct current from source 109 flows through cable 100 to terminal A and then through choke coil 102 to terminal M. Although choke coil 102 may facilitate the constancy of the direct current, it should be noted that, to the extent technically possible, the regulation of the direct current is accomplished with regulator 110. Applicant's invention is in no way dependent upon the particular means used to hold the direct current constant in cable 100.

From terminal M, the direct current will flow either through transistor switch 3 or through a path shunting switch 3. If transistor 3 lacks a base current, it will block. The direct current will then flow in part through capacitor 4 and winding 6 and in part through capacitor 9, winding 8, resistors 10 and 11, Zener diode 12 and winding 6 to terminal N in the manner described in the above-cited copending application of S. D. Bloom and applicant. At the same time, power will be delivered from winding 7 through diodes 13 and 18 of the output rectifier-filter to power terminals C–D of repeater 104. Since the currents in windings 7 and 8 are promoted by the voltages induced in windings 7 and 8 in response to the current flowing in winding 6, the respective loads of windings 7 and 8 are reflected to the terminals of winding 6 so that transformer 5 appears to be a substantially ideal transformer in spite of the rapid current changes which occur in it as the direct current flowing from terminal A is switched back and forth between winding 6 and transistor switch 3. This property of the transformer coupling between switch 3 and the output terminals C–D is more fully explained in the above-cited copending application of S. D. Bloom and applicant.

When the voltage on capacitor 4 becomes so large that winding 8 cannot sustain a current through resistor 11 large enough to keep transistor 3 nonconducting, transistor 3 will start to conduct, the current in winding 6 will decrease, and all of the induced voltages of the windings of transformer 5 will reverse. Winding 8 now promotes base current flow in transistor 3, and the conduction of transistor 3 will regeneratively increase until all of the direct current flowing through choke 102 flows from emitter to collector through transistor 3. The duration of the ensuing portion of the cycle will depend on the voltage stored on capacitor 9 during the time that transistor 3 was nonconducting, which in turn was determined by the voltage across load terminals C–D, by coupling from winding 7 to winding 8.

It is this feedback of the output voltage which moderates the average voltage which is presented between terminals M and N by the reactive storage impedance comprising capacitor 4, transformer 5, and capacitor 14. For example, as the voltage on capacitor 14 goes up, the induced voltage across winding 6 while switch 3 is open also goes up. The increased voltage on winding 6 reflects the changed output voltage to input terminals M and N. This undesired effect is compensated by the feedback of the output voltage through winding 8 to capacitor 9 to lengthen the next closed period of switch 3. This compensation tends to hold the average voltage across terminals M and N constant. The power regulatory function of the feedback from the output terminals C and D to capacitor 9 is more fully explained in the above-cited copending application of S. D. Bloom and applicant.

When the base current of transistor 3 falls to a value insufficient to sustain the then-existing value of collector current, regenerative switch-off of transistor 3 occurs. That is, some of the current flowing through choke 102 is directed through winding 6 of transformer 5, since it cannot flow through transistor 3. Such current flow in winding 6 changes the induced voltage of winding 8 to tend to oppose base current in transistor 3. More current is thereby directed through winding 6 until transistor 3 is cut off and all of the direct current is routed through capacitors 4 and 9 and their connected components, as described hereinbefore.

From terminal N, the constant direct current flows through choke 103 to terminal P. From terminal P, the direct current flows through a continuing section of cable 100 to terminal Q. From terminal Q it flows through choke 132 to terminal R.

From terminal R the direct current flows to terminal S either through switch 33 or a path which shunts switch 33, in the same manner as it flows from terminal M to terminal N. From terminal S the direct current flows through coke 133 to terminal B and into a continuing section of cable 100.

Power is supplied to terminals E and F of repeater 134, and feedback is provided to control switch 33, in the same manner as power is supplied to repeater 104 and feedback is provided to control switch 3.

The present invention resides particularly in the co-operation of the above-described switching converter circuits in supplying power to repeaters 104 and 134 in tandem with a moderated total voltage drop and improved efficiency. The total voltage drop between terminals A and B is moderated by holding the average voltage drops across terminal pairs M–N and R–S constant, as described hereinbefore, and by periodically closing switches 3 and 33, respectively, to limit the peak voltages built up across the aforesaid terminal pairs. Even if the peak voltages across terminal pairs M–N and R–S occur simultaneously, regulator 110 can still hold the current between terminals A and B substantially constant. However, a sufficiently large number of unsynchronized regulated switching converter power supplies along cable 100 will produce a statistical distribution of the opening and closing of their switches such that the peaks will not occur simultaneously and the voltage variation at the land terminals of the cable will be considerably less than the product of the voltage variation across one switch times the total number of switches along the cables. In fact, the R.M.S. voltage ripple appearing at source 109 will become a smaller percentage of the total direct-current voltage as the number of switches along cable 100 is increased. The efficiency of the power supplies is greater than that of the prior art because negligible energy is wasted in the shunt switches 3 and 33. That is, when switch 3 is open, no power is wasted in it; and power is being stored on capacitor 14. When switch 3 is closed, its resistance is nearly zero; and the substantially constant current flowing through it produces negligible heating. Likewise, when switch 33 is open, no power is wasted in it; and power is being stored on capacitor 44. When switch 33 is closed, its resistance is nearly zero; and the substantially constant current flowing through it produces negligible heating.

At the same time, the advantages of transformer output coupling in stepping voltage up or down and in isolating output terminals C–D and E–F from input terminals A and B are obtained. Widely different values of voltages may be provided at terminals C–D and E–F without wasting as much power in resistive heat dissipation as would be wasted in prior art systems. In addition, terminals C–D and E–F may be interconnected with ground in any desired manner or may be left entirely unconnected with winding 7 and 37, respectively, of transformers 5 and 35; and the continuous flow of the direct current is not thereby impaired. It will be noted that repeater 104 and 134 are completely isolated from the direct-current potentials along cable 100. A variety of similarly isolated loads in such positions along a power line might be interconnected among themselves without restraints as to relative potential levels. Also, two or more power supplies might be used at a single repeater location in a submarine cable system to achieve similar advantages. For example, repeater auxiliary equipment can be separately supplied and can be connected in any desired manner with the repeater.

The "transformerless," or capacitor energy storage, circuits of FIG. 3 of the above-cited copending application of S. D. Bloom and applicant may also be used to supply power to repeaters 104 and 134 by serially connecting their inputs between terminals A and B and by connecting one of their outputs across terminal pair C–D and another of their outputs across terminal pair E–F.

Although a submarine cable system has been selected for the purpose of illustration, the invention may be used in a variety of systems wherein a plurality of loads must be supplied in series. The loads need not be repeaters or communications equipment, but may be a variety of other power consuming devices. Such loads need not require a rectified and filtered direct-current output. The tendency of the feedback to moderate the average input voltage remains substantially the same as with a filtered direct-current output.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A system comprising a source of direct current including means for regulating said direct current to be substantially constant, a cable having a path for transmission of direct current connected across said source and a path for transmission of alternating current, a plurality of power consuming devices located along said cable including means connected in said alternating-current path for amplifying alternating currents, and a plurality of apparatuses having inputs connected in series with said direct-current path across said source and having outputs connected to said power consuming devices, said apparatuses being particularly characterized by reactive storage impedances connected across said inputs for storing energy and delivering energy to said outputs, switches connected across said inputs for periodically shunting said direct current around said reactive storage impedances, and means for controlling each of said switches in response to a parameter of the power supplied to one of said outputs.

2. A system for supplying power to a plurality of loads, comprising a source of direct current, a plurality of switches connected in series across said source, reactive storage circuits having inputs connected across said switches and outputs connected across said loads for coupling power from said source to said loads, and means for feeding back signals from said outputs to said switches to open and close said switches in response to a parameter of the power delivered to said loads to hold the average voltages across said inputs constant.

3. Apparatus having an input and a plurality of outputs for supplying power to a plurality of loads each connected across one of said outputs from a source of current connected across said input, comprising a plurality of switches connected in series across said input and a plurality of transformers each having a primary winding connected across one of said switches, an output winding connected across one of said outputs, and a feedback winding coupled to said one switch to open and close said one switch.

No references cited.

ROBERT H. ROSE, *Primary Examiner.*

H. ZELLER, *Assistant Examiner.*